(12) United States Patent
Fay et al.

(10) Patent No.: US 12,425,250 B2
(45) Date of Patent: Sep. 23, 2025

(54) SYSTEMS, METHODS, AND COMPUTER READABLE MEDIUM FOR DYNAMICALLY ANALYZING AND/OR MODIFYING BLOCKCHAIN NETWORKS

(71) Applicant: Edgevana, Inc., Las Vegas, NV (US)

(72) Inventors: Ryan Fay, San Diego, CA (US); Mark Thiele, Las Vegas, NV (US); Subhan Tamaddon Jahromi, Vienna, VA (US); Mohammad Nabi Paryavi, Kaysville, UT (US)

(73) Assignee: Edgevana, Inc., Las Vegas, NV (US)

( * ) Notice: Subject to any disclaimer, the term of this patent is extended or adjusted under 35 U.S.C. 154(b) by 157 days.

(21) Appl. No.: 18/493,586

(22) Filed: Oct. 24, 2023

(65) Prior Publication Data

US 2024/0137232 A1 Apr. 25, 2024
US 2024/0235862 A9 Jul. 11, 2024

Related U.S. Application Data

(60) Provisional application No. 63/419,256, filed on Oct. 25, 2022.

(51) Int. Cl.
*H04L 9/00* (2022.01)
(52) U.S. Cl.
CPC .................................. *H04L 9/50* (2022.05)
(58) Field of Classification Search
CPC .............................. H04L 9/50; H04L 9/3239
See application file for complete search history.

(56) References Cited

U.S. PATENT DOCUMENTS

| | | |
|---|---|---|
| 11,281,800 B2 | 3/2022 | Riedel et al. |
| 11,301,601 B2 | 4/2022 | Cahoon et al. |
| 11,347,612 B2 | 5/2022 | Knostman et al. |
| 2021/0027221 A1 | 1/2021 | Balakrishnan et al. |
| 2022/0067738 A1* | 3/2022 | Fang .................... G06Q 20/389 |
| 2024/0048383 A1* | 2/2024 | Freeman ............... G06Q 40/06 |

FOREIGN PATENT DOCUMENTS

| | | |
|---|---|---|
| CN | 109639786 | 4/2019 |
| CN | 109947740 | 6/2019 |
| CN | 110392115 | 10/2019 |
| CN | 113434505 | 9/2021 |
| WO | 2021/185905 | 9/2021 |

OTHER PUBLICATIONS

Hu et al., "Joint Optimization for Mobile Edge Computing-Enabled Blockchain Systems: A Deep Reinforcement Learning Approach," Sensors, 22, 3217, 25 pages (2022).

(Continued)

*Primary Examiner* — Azizul Choudhury
(74) *Attorney, Agent, or Firm* — Fox Rothschild LLP

(57) ABSTRACT

A methodology to determine the level of decentralization for systems that use distributed ledger technologies—including but not limited to blockchains—that comprise an overall measure of decentralization created by summing multiple measures that are calculated using the Gini Coefficient and weighted using predetermined criteria, which correspond to levels of decentralization based on various criteria for the miners or validators that make up the distributed ledger system.

5 Claims, 7 Drawing Sheets

(56) References Cited

OTHER PUBLICATIONS

Javaid et al., "Rogue Device Mitigation in the Internet of Things: A Blockchain-Based Access Control Approach," Mobile Information Systems, vol. 2020, Article ID 8831976, 13 pages (2020).
Priyadharshini and Canessane, "Light chain consensus reinforcement machine learning: An effective blockchain model for Internet of Things using for its advancement and challenges," Computational Intelligence, 22 pages (2020).

* cited by examiner

Fig. 2

$$G = \frac{\sum_{i=1}^{n}\sum_{j=1}^{n}|x_i - x_j|}{2\sum_{i=1}^{n}\sum_{j=1}^{n}x_j} = \frac{\sum_{i=1}^{n}\sum_{j=1}^{n}|x_i - x_j|}{2n\sum_{j=1}^{n}x_j} = \frac{\sum_{i=1}^{n}\sum_{j=1}^{n}|x_i - x_j|}{2n^2\bar{x}}$$

Fig. 4

Portion of Ranking: Total Value Index 2020 (Context Measurement)

| Rank | Country | Total Value Index | Classification |
|---|---|---|---|
| 1 | Denmark | 0.958 | Working Democracy |
| 2 | Norway | 0.956 | Working Democracy |
| 3 | Finland | 0.946 | Working Democracy |
| 4 | Sweden | 0.946 | Working Democracy |
| 5 | Germany | 0.944 | Working Democracy |
| 6 | Switzerland | 0.934 | Working Democracy |
| 7 | Netherlands | 0.93 | Working Democracy |
| 8 | New Zealand | 0.928 | Working Democracy |
| 9 | Belgium | 0.925 | Working Democracy |
| 10 | Costa Rica | 0.914 | Working Democracy |
| 11 | Spain | 0.912 | Working Democracy |
| 12 | Luxembourg | 0.905 | Working Democracy |
| 13 | Australia | 0.904 | Working Democracy |
| 14 | Estonia | 0.903 | Working Democracy |
| 15 | Iceland | 0.899 | Working Democracy |
| 16 | Ireland | 0.898 | Working Democracy |
| 17 | United Kingdom | 0.892 | Working Democracy |
| 18 | Austria | 0.89 | Working Democracy |
| 19 | France | 0.889 | Working Democracy |
| 20 | South Korea | 0.883 | Working Democracy |
| 21 | Lithuania | 0.879 | Working Democracy |
| 22 | Italy | 0.871 | Working Democracy |

Fig. 5

$$\text{Decentralization \%} = \begin{aligned}&1 - (([\text{mining/staking gini coefficient}] \times [\text{weight}]) \\ &+ ([\text{nodes/validators gini coefficient}] \times [\text{weight}]) \\ &+ ([\text{platforms/providers gini coefficient}] \times [\text{weight}]) + ([\text{geo gini coefficient}] \times [\text{weight}]))\end{aligned}$$

Fig. 6

| | Solana Decentralization Calculation Example | | | |
|---|---|---|---|---|
| Criteria | Metric | Gini Coefficient (0-1) | Weight (%) | Weighted Gini Coefficient (0-1) |
| Mining/Staking | reward/stake | 0.6799040021 | 30% | 0.2039712006 |
| Nodes\Validators | count | 0.5 | 25% | 0.125 |
| Platforms/Providers | name | 0.8860453887 | 30% | 0.2658136166 |
| Geo | country | 0.6820197259 | 15% | 0.1033252106 |
| | | Total | 100% | 0.6981100278 |

30.19% Decentralized

SYSTEMS, METHODS, AND COMPUTER READABLE MEDIUM FOR DYNAMICALLY ANALYZING AND/OR MODIFYING BLOCKCHAIN NETWORKS

CROSS REFERENCE TO RELATED APPLICATIONS

This application claims the benefit of priority to U.S. Patent Application No. 63/419,256, filed on Oct. 25, 2022, the entire contents of which are herein incorporated by reference.

FIELD OF THE INVENTION

The present invention relates to decentralized blockchain systems. More specifically, embodiments of the present invention relate determining the level of decentralization for a given blockchain.

BACKGROUND

The release in October 2008, of the paper Bitcoin: A Peer-to-Peer Electronic Cash System, and the subsequent release of the open-source Bitcoin software in January 2009, ushered in a new type of distributed ledger technology called blockchain. A blockchain is a decentralized, distributed, and often public, digital ledger consisting of records called blocks that are used to record transactions across many computers so that any involved block cannot be altered retroactively, without the alteration of all subsequent blocks. This allows the participants to verify and audit transactions independently and relatively inexpensively.

A blockchain database is managed autonomously using a peer-to-peer network and a distributed timestamping server. They are authenticated by group collaboration powered by collective self-interests. Such a design facilitates robust workflow where participants' uncertainty regarding data security is marginal. The use of a blockchain removes the characteristic of infinite reproducibility from a digital asset. It confirms that each unit of value was transferred only once, solving the long-standing problem of double-spending. A blockchain has been described as a value-exchange protocol. A blockchain can maintain title rights because, when properly set up to detail the exchange agreement, it provides a record that compels offer and acceptance.

BRIEF SUMMARY OF THE INVENTION

Embodiments of the present invention are directed to systems, method, and computer readable medium related to the processes to determine a numerical designation of how decentralized a particular blockchain is. This involves calculating the individual Gini coefficient for a number of criteria, weighting each of those results out of 100%, and then adding each of those results to produce an overall Gini coefficient, or Decentralization Score for the blockchain as a whole. For clarification, the term Decentralization Score is only used sometimes herein. In general, the Gini coefficient is an economics measurement of the statistical dispersion of the measured values—normally used to measure income inequality.

Embodiments can include processes for collecting information (e.g., to assist in determining the current state of the blockchain). The information that needs to be collected to accurately calculate the level of decentralization for a specific blockchain is the following:

1. Distribution of the reward for Proof of Work (PoW) miners, or Distribution of Stake (PoS) for Proof of Stake Validators
2. Total number of PoW miners, or Total number of PoS Validators
3. Distribution of the number of infrastructure providers on which the mining or validating servers run on
4. Distribution of mining or validating servers per geographic area In accordance to one or more embodiments, a computer-implemented system is provided for evaluating a resiliency of an operating distributed blockchain network from centralized control over transaction processing and/or a ledger block and/or (in response) modifying the operating blockchain network. The system comprises a computer comprising a processor, non-volatile memory, computer readable instructions implemented on the non-volatile memory, wherein the computer is configured to perform steps to provide features or functions. The system can be configured to implement a first automated process that collects information from the blockchain network that gathers on-chain information from the blockchain network, and implements a second automated process that collects information from designated network sources that gather off-chain information about the blockchain network. The system can be configured to perform an algorithm that combines, at least, partly, the on-chain information and the off-chain information, wherein the algorithm comprises, using a first aspect of the on-chain information representing a quantity of validator nodes operating in the blockchain network to produce a first value (e.g., using a Gini coefficient, the quantity of validators (itself)), using the Gini coefficient on a second aspect of the on-chain information representing a distribution of stake across total number of validator nodes supporting the blockchain network to produce a second value, using the Gini coefficient on a first aspect of the off-chain information representing a level of geographic distribution of validator nodes to produce a third value, and using the Gini coefficient on a second aspect of the off-chain information representing a level of distribution of validator nodes with regards to underlying public/private cloud, colocation, or datacenter platforms running the validator nodes that support the blockchain network to produce a fourth value, and combining the first value, second value, third value, and fourth value using corresponding weight factors to generate a fifth value representing a projected level of the blockchain network, as currently configured, to centralized control over transactions or ledge blocks. The system can be configured to generate a set of instructions that adapts, as a function of the fifth value, a node to be a new validator node on the operating block chain network. For example, the system configured a new node to be operable and joined to the blockchain network wherein the selection of node and/or its configuration or setting is based on the fifth value (e.g., so as to raise or strengthen the fifth value when the node is added to the network).

The computer-implemented system can be configured to work with a plurality of operating blockchain networks that each implements a different distributed ledger protocol and the computer is configured to adapt the algorithm based on the operating blockchain network. The operating blockchain networks are public networks that are open to be joined by the public using their own equipment. The system can further comprise a plurality of available nodes and wherein the instructions adapt one of the available nodes to join the blockchain network. The system can be configured to display the fifth value and corresponding identification of the blockchain network (to a user on a user computer such as via browser), and to further display the fifth value as determined for other operating blockchain networks.

The system can be configured to provide a plurality or users to select an option to automatically configure a new validator node on the block chain wherein the selecting user is identified as the owner.

The objective is to generate reliable representations using readily available information that can operate as a reasonable proxy for actual underlying details and to do so in a quick and potentially real time or live way for a current operating blockchain network. As such, in some embodiments, the algorithm consists essentially of the algorithm that produces the fifth value as described in this section. In some embodiments, no additional on-chain or off-chain information and no additional operation on the first through fifth values are performed to provide the score (the fifth value). Applicant has found this provides a uniquely quick and reliable tool.

As would be understood, corresponding or counterpart method and computer readable medium embodiments are understood and contemplated.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 2 depicts the mathematical equation for calculating the Gini Coefficient;

FIG. 4 is one example of a portion of a country weighting system using the level of democracy as a proxy for countries that are either hostile or non-hostile to blockchain technologies (Provided by the University of Würzburg); This is a portion provided as an example.

FIG. 5 depicts the mathematical equation for application in determining the overall decentralization percentage for a given distributed system;

FIG. 6 depicts a chart showing examples of a weighting system, the weighted Gini Coefficients, and the final decentralization percentage, using the Solana blockchain as the example distributed system.

DETAILED DESCRIPTION OF THE INVENTION

The terminology used herein is for the purpose of describing particular embodiments only and is not intended to be limiting of the intention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing embodiments of the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For illustrative purposes, embodiments described herein are directed to blockchain implementations that are PoS or include PoS (e.g., there are hybrid or mixed blockchain networks).

Figure 1:
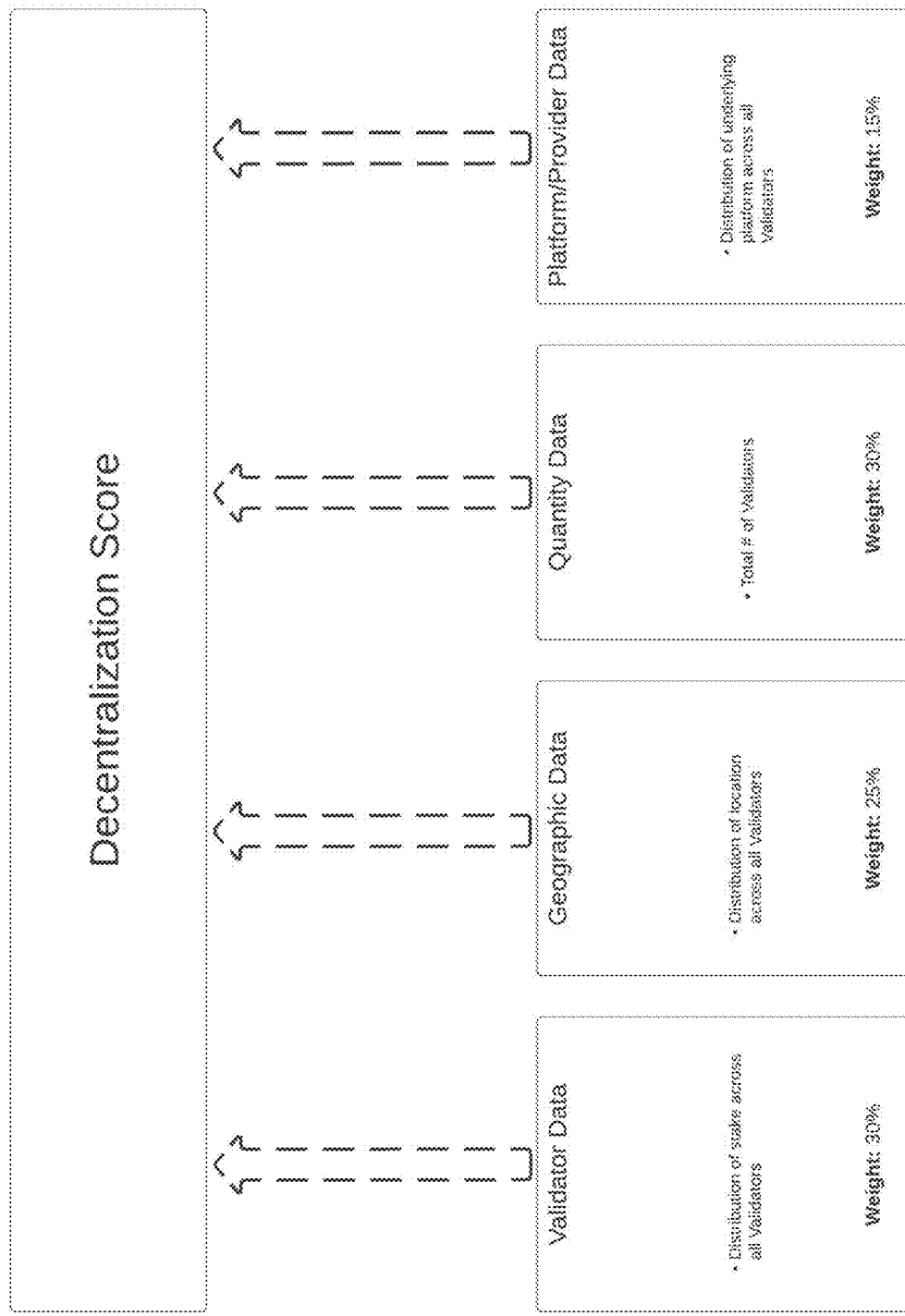
FIG. 1 depicts a general illustration of the components & weights used to calculate the level of decentralization of a blockchain.

As shown in FIG. 1, the methodology to determine the level of decentralization for a given blockchain, as described herein, requires determining the level of decentralization, or distribution across the total number of miners or validators using four (4) independent criteria:: 1) The total number of validator servers that are supporting the blockchain, 2) Distribution of stake across all active validators, 3) Geographic distribution of validators by country, 4) Distribution of platforms or providers that are providing infrastructure to run the validator servers. The method to determine the decentralization/distribution of the above-mentioned criteria is to generate the Gini Coefficient for each criteria, apply a predetermined weight to each result, and sum each result to get the overall decentralization level for the blockchain.

Figure 3:
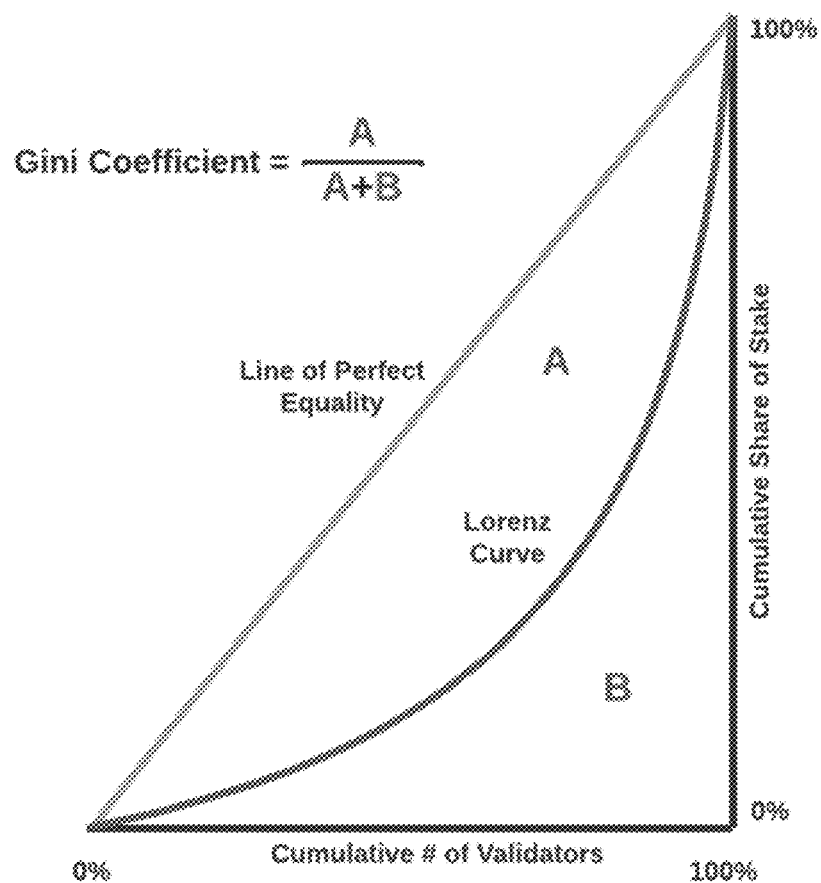
FIG. 3 depicts an illustration of the Gini Coefficient.

The Gini coefficient is a single number with a range from zero (0) to one (1), or zero percent (0%) to one-hundred percent (100%), that demonstrates a degree of inequality in a distribution. It is commonly used to estimate how far a country's wealth or income distribution deviates from a totally equal distribution. FIG. 2 shows the mathematical equation for calculating the Gini Coefficient, while FIG. 3 shows the graphical representation of the Gini Coefficient. When using the Gini Coefficient to measure decentralization, a measurement of one (1) is equal to fully centralized, while a measurement of zero (0) is equal to fully decentralized.

To measure the total quantity of validator servers in terms of the effect that particular quantity has on decentralization, it is necessary to understand that the goal of decentralization is to avoid a single entity or group of entities controlling a majority of the validator servers. For example, a "majority" in this case, is fifty-one percent (51%) or greater. To that end, a blockchain with fifty (50) or fewer validator servers is designated to have a Gini Coefficient for the Number of Nodes, of one (1). A blockchain with fifty-one (51) to two hundred (200) validator servers is designated to have a Gini Coefficient for the Number of Nodes, of three-quarters (0.75). A blockchain with two hundred and one (201) to one thousand (1000) validator servers is designated to have a Gini Coefficient for the Number of Nodes, of one-half (0.50). A blockchain with one thousand and one (1001) to ten thousand (10000) validator servers is designated to have a Gini Coefficient for the Number of Nodes, of one-quarter (0.25). A blockchain with more than ten thousand and one (10001) validator servers is designated to have a Gini Coefficient for the Number of Nodes, of zero (0).

To measure the distribution of stake across all validator servers supporting a specific blockchain, requires capturing the stake distribution directly from the data available on the blockchain in question. The particular method of this data capture can differ depending on the particular blockchain. For example, to capture this data from the Solana blockchain requires a two (2) step process to one (1), request the complete list of validators on the blockchain using the "getClusterNodes" method (curl [https://api.devnet.solana.com](https://api.devnet.solana.com/) -X POST -H "Content-Type: application/json" -d '{"jsonrpc":"2.0", "id":1, "method":"getClusterNodes"}), and two (2), request the specific per-validator data that includes the exact staked amount, using the "getMultipleAccounts" method, specifying the validators' public keys collected from the first step as parameters (ie. curl http://localhost:8899 -X POST -H "Content-Type: application/json" -d '{"jsonrpc": "2.0", "id": 1, "method": "getMultipleAccounts", "params": [["vines1-vzrYbzLMRdu58ou5XTby4qAqVRLmqo36NKPTg", "4f-Y Nw3dojWmQ4dXtSGE9epjRGy9pFSx62YypT7avPY-vA"], {"dataSlice": {"offset": 0, "length": 0}}]}'). Once the individual stake amounts for every validator on the blockchain network are collected, the Gini Coefficient (FIG. 2) is applied to generate the measurement of decentralization of stake, with a measure closer to one (1) indicating lower decentralization and higher concentration of stake in fewer validators, and a measure closer to zero (0) indicating higher decentralization and more equal distribution of stake over a larger number of validators.

To measure the geographic distribution of validator servers requires plotting the distribution of servers across the total number of countries in the world. In addition, because the local laws & general operating environments can differ greatly from country to country, it is necessary to provide a country weighting system so that countries with either existing or future possibilities of hostile policies towards distributed blockchain solutions are not weighted as much as countries deemed less or non-hostile. To that end, weighing countries by their level of quality of democracy, as assessed by a prominent & well respected organization, can be used as a proxy for determining the relative hostility. The assumption being, countries that are less democratic (more authoritarian) have a greater likelihood of hostile policies against technologies that they are unable to fully control, and vice versa for countries that are more democratic.

One example of a weighting system created by a well-known and respected organization is the Total Value Index (FIG. 4), a part of the Democracy Matrix, funded by the German Research Foundation and conducted by the Chair of Comparative Politics and German Government at the University of Würzburg in Germany. The Total Value Index ranks, indexes, and categorizes all of the countries in the world by the level of democracy they provide, with the index being a decimal number between zero (0) and one (1), and the classification of each country being one of the following: Working Democracy, Deficient Democracy, Hybrid Regime, Moderate Autocracy, Hard Autocracy.

The methodology to determine or specify the overall geographic distribution of validator nodes by country weighted by the level of democracy, is to distribute the total count of validator nodes across the countries in which they're located—each country having a specific weight that corresponds to their level of democracy in comparison to the other countries (Total Value Index from the example above). The Gini Coefficient is then calculated (FIG. 2) using the weighted distribution, providing an overall rating between zero (0) and one (1)—with zero (0) being fully decentralized, and one (1) being fully centralized—of how geographically decentralized the validator nodes are for the specific blockchain in question.

To measure the distribution of validator servers across the underlying providers & platforms they run on, requires a multi-step approach of first, capturing the public IP address of every known validator, and second, mapping those IP addresses to the specific providers they've been assigned to. For example, to capture this data from the Solana blockchain, you would request the complete list of validators on the blockchain using the "getClusterNodes" method (curl [https://api.devnet.solana.com](https://api.devnet.solana.com/) -X POST -H "Content-Type: application/json" -d '{"jsonrpc":"2.0", "id":1, "method": "getClusterNodes"}'). This on-chain request would provide, among other things, the full list of validator nodes with their associated IP addresses. Those IP addresses can then be associated with specific providers by running a "whois" query against them and recording the "OrgName" field as the provider for that specific IP address, and by association, the validator.

Once all of the validators have their providers recorded, the Gini Coefficient (FIG. 2) is applied to generate the measurement of decentralization, with regards to the number of unique providers, with a measure closer to one (1) indicating lower decentralization and higher concentration of stake in fewer validators, and a measure closer to zero (0) indicating higher decentralization and more equal distribution of stake over a larger number of validators.

After the Gini Coefficients for all of the categories have been calculated, each one is given a specific weight depending on predetermined criteria, including but not limited to importance or risk. As shown in FIG. 5, each Gini Coefficients are then multiplied by the weight percentage to get the weighted Gini Coefficients. Those weighted Gini Coefficients are then added together to get the overall weighted Gini Coefficient for the distributed system. To get the overall decentralization percentage, subtract the overall weighted Gini Coefficient from one (1). FIG. 6 shows a chart that includes examples of each individually calculated Gini Coefficient, weighted Gini Coefficients, and finally, the overall decentralization score for the distributed system.

Figure 7:
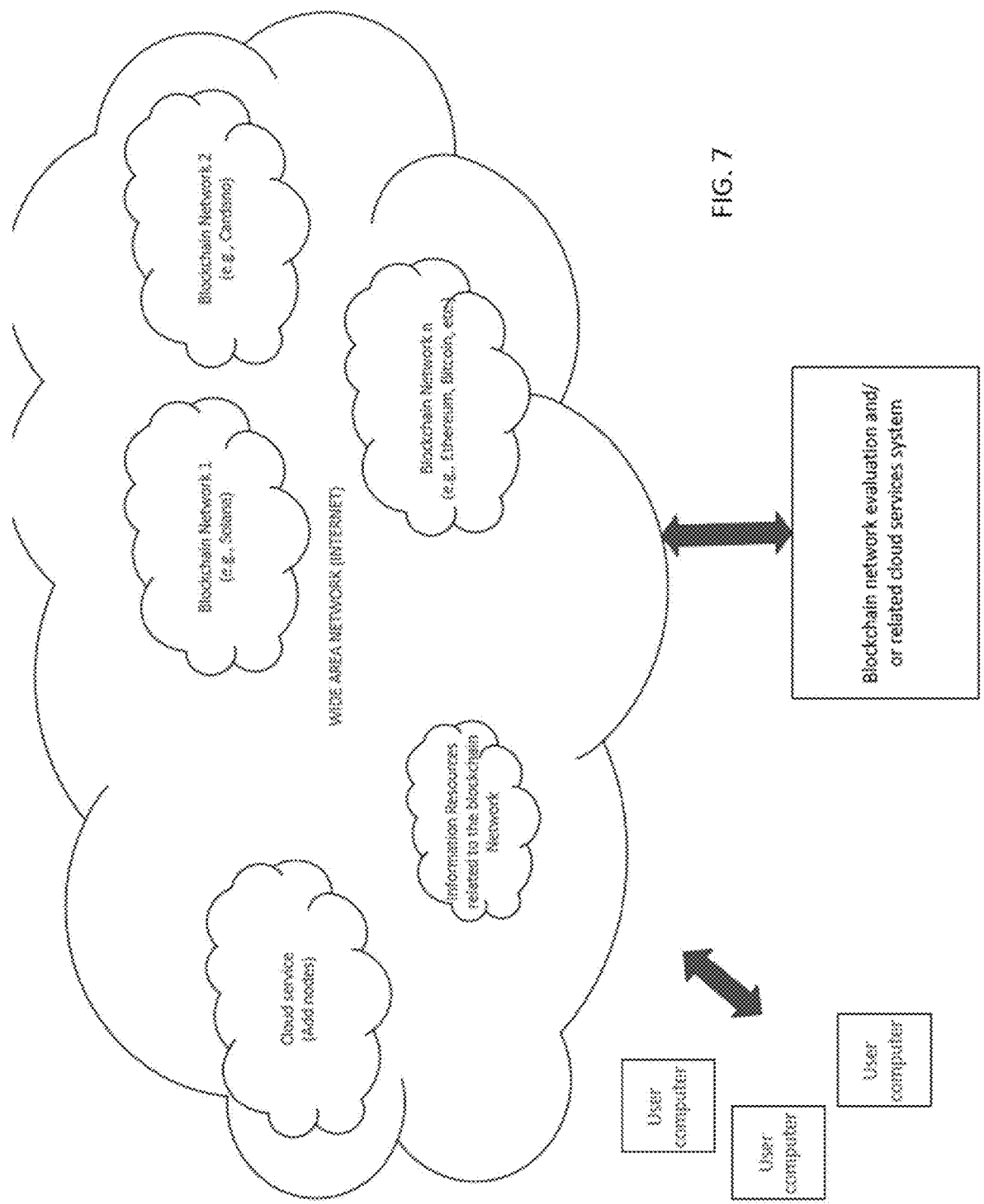
FIG. 7 is a functional block diagram illustrating embodiments of the service systems and related features in accordance with one or more embodiments of the present invention.

FIG. 7 is a functional block diagram (not drawn to scale) that illustrates one or more embodiments of the present invention. As shown, a blockchain network evaluation and/or related cloud service system is provided, which may sometimes be referred to as the service system. Also, as shown, are a plurality of blockchain networks that are implemented on a public wide area network and in this example, on the Internet. The blockchain networks are peer-to-peer networks that operate in accordance with a particular distributed ledger protocol that is implemented for that blockchain network to handle transactions and applications. Blockchain networks typically implement protocols that are available to the public and operate in accordance a protocol that is decentralized to avoid centralized control or manipulation. The block chain network are configured to include nodes as validator nodes or miner nodes (for the sake of simplicity we may refer to these as validator nodes). The validator nodes are configured to automatically execute the distributed ledge protocol of that blockchain network and continue to process requested transactions automatically by the network of validator nodes that implement that block chain network. The protocols are configured to apply distributed control and maintain an immutable ledger of processed transactions. As shown, FIG. 7 shows three blockchain networks 1, 2, . . . n which represents that in reality there are many more block chain networks implementing different or distinct protocols on the Internet. Examples of existing blockchain network are Solana, Cardano, Ethereum, and many others. The service system is configured to be on the Internet and be able to communicate with these block chain networks and other resources to collect information. The other information can be on the Internet such as the diagram component labeled Information Resources related to the Blockchain Networks. This is a simplified representation of one or more servers or resources available that are configured to allow the service system to collect information.

As shown, the diagram includes a cloud service. The cloud services is for example a data center implemented on the Internet that is part of the service system is configured to cooperatively operate with the service system. The cloud service can be configured to include an automated process to create and configure new validator nodes and add the new validator node to the blockchain network on which it has been configured to operate.

User computers are illustrated to demonstrate that the service system may be configured to interact with users via their user computers to perform tasks or implement applications using the service system. User computers can, for example, communicate with the service system over the Internet.

The service system can be a computer (or computer system) comprising a processor and non-volatile (non-transitory) memory that implements computer readable instructions to carry out functions contemplated herein. The service system is configured to store rules and/or information adapted for each of the blockchain networks (1 . . . n). The rules and/or information include automated processes that collect certain types of information for that block chain network (collects on-chain information form that blockchain network). The rules and/or information include automated processes that collection of certain types of information for that blockchain network from information resources, such as servers, other than the computers that implement or operate that blockchain network. These are resources that are external to that blockchain network. The service system may be further configured to interact with the user systems to display to users results of its operation and option(s) to interact with service system to receive online services.

The service system is a computer-implemented system that is configured to evaluate, analyze, or diagnose a resiliency of an operating blockchain network from centralized control over transaction processing and/or ledger blocks. The service system is configured to for example generate a decentralization score which is representative of the strength of the blockchain network from attack such as by a collaborative effort (by multiple nodes that operate or support that blockchain network) to modify transactions or the ledger to record incorrect data or to change the data. Embodiments of the present invention are more accurate than known prior art systems in determining the blockchain resiliency and the use of the analysis to modify or update the blockchain network, and for other applications.

The service performs an algorithm that generates the analysis. The service system can be configured to carry out an automated process that collects information from a selected blockchain network that gathers on-chain information from the blockchain network. The service system is configured to store rules and/or information comprising a set of instructions compatible with the selected blockchain network that collects specific information from the selected blockchain network about its current state, operation, or characteristics. The collected information is further described herein such as the number of validator nodes and the stake of validator nodes. The service system is configured to include an off-chain data collection automated process that collects information from designated network sources that gather off-chain information about the blockchain network.

The service systems is configured to perform an algorithm that combines, at least, partly, the on-chain information and the off-chain information, wherein the algorithm comprises using a first aspect of the on-chain information representing a quantity of validator nodes operating in the blockchain network to produce a quantity value (e.g., using Gini coefficient or the quantity of the validators (itself)), uses the Gini coefficient on a second aspect of the on-chain information representing a distribution of stake across total number of validator nodes supporting the blockchain network to produce a stake distribution value, uses the Gini coefficient on a first aspect of the off-chain information representing a level of geographic distribution of validator nodes to produce a geographic distribution value, and uses the Gini coefficient on a second aspect of the off-chain information representing a level of distribution of validator nodes with regards to underlying public/private cloud, colocation, or datacenter platforms (for convenience sometimes referred simply platforms) running the validator nodes that support the blockchain network to produce a platform distribution value, and combining the quantity value, stake distribution value, geographic distribution value, and platform distribution value using corresponding weight factors to generate a resiliency or decentralization value representing a projected level of the blockchain network, as currently configured, to resist or prevent centralized control over transactions or ledger blocks. As discussed, the service system can collect addresses for the validator nodes (which are public) from the blockchain network and apply a conversion that determines geographic location (off chain information) of the validator node such as the country using the IP address (or other address or information). The service system is configured to use the addresses to also collect information about the platform, data center, or owning systems. As described, the IP addresses can be mapped to such platforms and by doing so, the system determines distribution of how many validator nodes in the blockchain network on that same platform.

The service systems can be configured to provide services so users such as to allow the user to interact with the service system to have the service system configure a new validator node for that blockchain network. Other services can be to modify the blockchain network in other ways such as removing a validator node. The service system can include data center to provide cloud services such as adding nodes to the selected blockchain network or other related services.

For example, the service system can be configured to include a set of instructions such as software code that it generates based on the stored instructions that is adapted for the selected blockchain network to configure and add a new validator node to that selected blockchain network. The service system can be configured to provide this service to users over the Internet as a service for automatically adding a new validator node to that blockchain network for a user as the owner of that node as recorded on supporting databases. The user would then for example have control over a dashboard that monitors and controls the new validator node.

The service system can be configured to be able to contain a set of instructions or information for each of a plurality of different blockchain networks. Each blockchain network can be a peer-to-peer distributed network that is configured to process transactions and maintain a ledger using a (different) distributed control process and/or verification of the transactions and recorded data. There may be hundred or thousands of different operating blockchain networks (or different types of blockchain networks) with each having its own protocols related to the obtaining on-chain information from that network and its own protocols for operating on that blockchain. For example, a Solana node is configured differently from an Ethereum node and adding a new node involves generating instructions and implementing configuration information that is different for each of those blockchain networks. The nodes are not interchangeable between the two networks. The service system would be configured to receive instructions from a user (user computer) to add a node and would then convert that instruction, using the database of instructions and information for each blockchain network, to convert that instruction to a set of computer instructions, messages, and information that configures a computer node (e.g., at a data center) to be adapted to operate within and/or added to that blockchain network.

The service system would also include a database of saved processes for each blockchain network for automatically obtaining desired on-chain data from each of the block chain networks (since each may be configured differently). An example is provided above for Solana and the service system would automatically perform that process. An automated process involving commands or other messaging that is implemented for each block chain network (in correlation with that block chain network) that is executed by the service system to collect desired off-chain data for that blockchain network. This can preconfigure the service system to maintain live, parallel, simultaneous, and/or real time processes for each blockchain network (separately) and in response, generate a current evaluation, analysis, or diagnostic of each of the blockchain networks. Further in response, applications can be implemented that display the current state (resiliency determination using the determined value), changes in the state (e.g., over time), and historical views of the state by day, time of day, month, or other time frame or increment.

In operation, the service system is configured to perform a simulation that evaluates the state of a selected blockchain network with the addition of a new validator node configured with a set of proposed configuration settings comprising, for example, location of the new node (e.g., based on IP address) and the platform of the new node. The service system would compare the new score using the algorithm and the proposed configuration settings and in response, take an action such as add the proposed node with that configuration or reject the option of adding that node. For example, a score comparison using the algorithm may determine that the new score is weaker (e.g., lower) than the current score. In response to such an assessment, e.g., when the proposed addition weakens the resiliency of that blockchain network, the service system may reject or recommend to reject that proposed node addition. The service system can be configured to store a list of available nodes and related configuration settings such as the location and/or platform of the available nodes. The service system is configured to apply a process to parse or scan through the list and identify (based on the score using the algorithm) a set of available nodes that provide the best improvement in the score (using the simulation against the current score). The service system can be configured to select the top n number (e.g., top 3) of results or top x percent (e.g., 10%) of the results. The service system can also apply other factors to the selection in selecting a one or more final results for the available. The service system can be configured to display the results and allow a user via a user computer to select which proposed node (and related setting) to add to that block chain network.

The service system can be configured to continually (e.g., on a live real time basis such as every minute) generate the score using the algorithm and in response, automatically select and configure new nodes to add to a blockchain network when the score determined by the algorithm drops to s threshold level that represents that the blockchain network is at such a weak level of decentralized control that its modification such as by additions of newly configured nodes are need to raise the state of the blockchain network. The service system can be configured to continually or periodically (or combination thereof) conduct this monitoring (for each blockchain network) and automatically take action to modify the nodes in the block chain network (using the on-chain, off-chain process and evaluation algorithm).

As an example for calculating the Gini coefficient for location information, assume for the example that the blockchain of interest includes validator nodes in Denmark (with a working democracy total value index of 0.958), Chile (with a working democracy total value index of 0.84), and Brazil (with a working democracy total value index of 0.599), the Gini Coefficient can be determined using the weighted distribution, as follow:

There can be a direct relationship between the democracy index and the decentralization index, where a higher democracy index means a more decentralized environment for nodes.

Here's a step-by-step approach:
Determine Node Distribution:
  Nd is the number of nodes in Denmark, Nc in Chile, and Nb in Brazil.
  The total number of nodes, Nt, is Nd+Nc+Nb.
Calculate Weighted Distribution:
  Weighted value for Denmark: Wd=Nd×0.958
  Weighted value for Chile: Wc=Nc×0.84
  Weighted value for Brazil: Wb=Nb×0.599
Determine Cumulative Population and Wealth Percentages:
  Sort the countries based on the weighted values.
  Calculate the cumulative percentage of nodes (akin to the population in the typical Gini calculation) and the cumulative percentage of the weighted value (akin to wealth).
Calculate the Gini Coefficient:
  Use the Lorenz curve method, where the cumulative percentage of nodes are plotted against the cumulative percentage of the weighted value.
  The Gini coefficient is G=1−2A, where A is the area between the line of equality (a 45-degree line) and the Lorenz curve. The value will range from 0 (perfect equality) to 1 (maximum inequality).
In the context provided:
  A Gini coefficient of 0 would imply that nodes are distributed perfectly according to the democratic indices of the countries.
  A Gini coefficient of 1 would suggest maximum inequality, meaning one country with a high democracy index has all the nodes, leading to full centralization.

Given the following values:
 Number of nodes in Denmark (Nd)=5
 Number of nodes in Chile (Nc)=11
 Number of nodes in Brazil (Bb)=26
The Gini coefficient, G, is calculated using the trapezoidal rule for the Lorenz curve as:
Cumulative Population and Wealth Percentages:
 Cumulative percentage of nodes for Brazil=26/42
 Cumulative percentage of nodes for Chile=(26+11)/42=37/42
 Cumulative percentage of nodes for Denmark=1 (100%)
 Cumulative percentage of weighted value for Brazil=15.574/29.604
 Cumulative percentage of weighted value for Chile=(15.574+9.24)/29.604
 Cumulative percentage of weighted value for Denmark=1 (100%)
Trapezoidal Rule for Lorenz Curve:
For Brazil to Chile:
 Height=3742−26424237−4226
 Base1=15.57429.60429.60415.574
 Base2=15.574+9.2429.60429.60415.574+9.24

$$A1=0.5\times(Base1+Base2)\times Height$$

$$A1=0.5\times(0.5259+0.8374)\times 0.2619$$

$$A1\approx 0.1780$$

For Chile to Denmark:
 Height=1−37/42
 Base1=(15.574+9.24)/29.604
 Base2=1

$$A2=0.5\times(0.8374+1)\times 0.119$$

$$A2\approx 0.1094$$

$$\text{Total area } A=A1+A2=0.1780+0.1094=0.2874$$

Calculate Gini Coefficient:

$$G=1-2A$$

$$G=1-2(0.2874)$$

$$G\approx 0.4252$$

Thus, the Gini coefficient G for the distribution based on the provided weights and node distribution is approximately 0.4252.

The computer-implemented system can be configured to provide a plurality of users the ability to select an option to automatically configure a new validator node on the block chain wherein the selecting user is identified as the owner by the service system in the on-chain information of blockchain network. Embodiments of the present invention include one or more applications in which the determined distribution level or status is applied to control or modify operations of a computer system. The computer system can use the determined level to select parameters for blockchain security, modification, and node additions or removal, and apply the parameters on the computer system to implement related actions or processes. The level can be displayed to a user via an interactive graphical interface such as using a browser. The system can be configured to continuously (e.g., every minute) collect, determine, and operate the method such as to provide a live (or real time) graphical monitor to users and related applications. In some embodiments, the system produces or uses a model based on available data from the blockchain (not requiring permissions such as password or special login) that represents the distribution level of the blockchain. What may be called the actual distribution such as by using actual geolocation of each node may be impossible or too complex and embodiments of the present invention provide for a reliable solution. As should be understood, the security and effective operation of a blockchain can be highly dependent on the level of distribution.

The location of nodes (e.g., if available) can be determined using other techniques. For example, in some types of blockchain networks, computers, or operating systems a GPS location or geolocation may be stored or available for the node (itself) or from other sources (e.g., stored in a table). In some embodiments, if the protocol of the peer-to-peer distributed ledger is public and implements additional data collection and storage requirement for nodes, the algorithm can collect the information for the algorithm only from the selected blockchain network. The algorithm would use on-chain information and may not use off-chain information. This can exist if the protocol mandates certain information be stored and be available for each node. This can include situations if there are pools of miners or validators are formed and the network requires that the (current) association with a pool is recorded in the available data on that blockchain network or elsewhere.

A computer system, sometimes referred to as a computer, including for example a server can be used to implement embodiments of the present invention.

A computer system can be implemented using on one or more computer systems and be configured to communicate over a network. They all may also be implemented on one single computer system. In one embodiment, the computer system includes a bus or other communication mechanism for communicating information, and a hardware processor coupled with bus for processing information.

The computer system also includes a main memory, such as a random access memory (RAM) or other dynamic storage device, coupled to bus for storing information and instructions to be executed by processor. Main memory also may be used for storing temporary variables or other intermediate information during execution of instructions to be executed by processor. Such instructions, when stored in non-transitory storage media accessible to processor, render computer system into a special-purpose machine that is customized to perform the operations specified in the instructions.

The computer system further includes a read only memory (ROM) or other static storage device coupled to bus for storing static information and instructions for processor. A storage device, such as a magnetic disk or optical disk, is provided and coupled to bus for storing information and instructions.

The computer system may be coupled via bus to a display, such as a cathode ray tube (CRT), for displaying information to a computer user. An input device, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

The computer system may implement the techniques described herein using customized hard-wired logic, one or more ASICs or FPGAs, firmware and/or program logic which in combination with the computer system causes or programs computer system to be a special-purpose machine. According to one embodiment, the techniques herein are performed by the computer system in response to the processor executing one or more sequences of one or more instructions contained in main memory. Such instructions may be read into main memory from another storage medium, such as storage device. Execution of the sequences of instructions contained in main memory causes the processor to perform the process steps described herein. In alternative embodiments, hard-wired circuitry may be used in place of or in combination with software instructions.

The term storage media (or memory) as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device. Volatile media includes dynamic memory, such as main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more instructions to the processor for execution. For example, the instructions may initially be carried on a magnetic disk or solid state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor retrieves and executes the instructions. The instructions received by main memory may optionally be stored on storage device either before or after execution by the processor.

The computer system also includes a communication interface coupled to bus. The communication interface provides a two-way data communication coupling to a network link that is connected to a local network. For example, the communication interface may be an integrated services digital network (ISDN) card, cable modem, satellite modem, or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

Network link typically provides data communication through one or more networks to other data devices. For instance, network link may provide a connection through local network to a host computer or to data equipment operated by an Internet Service Provider (ISP). ISP in turn provides data communication services through the world wide packet data communication network now commonly referred to as the "Internet." Local network and Internet both use electrical, electromagnetic or optical signals that carry digital data streams. The signals through the various networks and the signals on network link and through the communication interface, which carry the digital data to and from the computer system, are example forms of transmission media.

The computer system can send messages and receive data, including program code, through the network(s), network link and the communication interface. In the Internet example, a server might transmit a requested code for an application program through Internet, ISP, local network and the communication interface.

The received code may be executed by the processor as it is received, and/or stored in storage device, or other non-volatile storage for later execution.

It is understood from the above description that the functionality and features of the systems, devices, or methods of embodiments of the present invention include generating and sending signals, packets, or messages to accomplish the actions.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention. Applications of the technology to other fields are also contemplated.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

The terms "may" or "can" (or similar terms) are used herein to mean that the disclosure contemplates not that just that provided description or combination of descriptions. This is not to communicate that the use of the term "is" or "are" (or similar terms) is meant to communicate that the invention or embodiments herein are limited that associated description. The specification includes examples for understanding the embodiments of the invention (regardless, for example, whether "is" or "may" is used).

It is also implicit and understood that the systems illustratively described herein provide computer-implemented functionality that automatically performs a process or process step.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention.

It should be understood that combinations of described features or steps are contemplated even if they are not described directly together or not in the same context.

Software applications can be implemented as distinct modules or can be integrated together into an overall application such as one that includes the user interface and that handles other features for providing the functionality to the user on his device.

It is intended that the specification and examples be considered as exemplary only, with a true scope being indicated by the claims and their equivalents.

The invention claimed is:

1. A computer-implemented system for evaluating a resiliency of an operating blockchain network from centralized control over transaction processing and/or ledger blocks and modifying the operating blockchain network, comprising:
    a computer comprising a processor, non-volatile memory, computer readable instructions implemented on the non-volatile memory, wherein the computer is configured to perform steps comprising:
        implementing a first automated process that collects information from the blockchain network that gathers on-chain information from the blockchain network;
        implementing a second automated process that collects information from designated network sources that gather off-chain information about the blockchain network;
        performing an algorithm that combines, at least, partly, the on-chain information and the off-chain information, wherein the algorithm comprises:
            using a first aspect of the on-chain information representing a quantity of validator nodes operating in the blockchain network to produce a first value,
            using the Gini coefficient on a second aspect of the on-chain information representing a distribution of stake across total number of validator nodes supporting the blockchain network to produce a second value,
            using the Gini coefficient on a first aspect of the off-chain information representing a level of geographic distribution of validator nodes to produce a third value, and
            using the Gini coefficient on a second aspect of the off-chain information representing a level of distribution of validator nodes with regards to underlying public/private cloud, colocation, or datacenter platforms running the validator nodes that support the blockchain network to produce a fourth value;
        combining the first value, second value, third value, and fourth value using corresponding weight factors to generate a fifth value representing a projected level of the blockchain network, as currently configured, to centralized control over transactions or ledge blocks; and
        generating a set of instructions that adapts, as a function of the fifth value, a node to be a new validator node on the operating block chain network.

2. The computer-implemented system of claim 1 wherein the system is configured to work with a plurality of operating blockchain networks that each implements a different distributed ledger protocol and the computer is configured to adapt the algorithm based on the operating blockchain network.

3. The computer-implemented system of claim 1 wherein the system further comprises a plurality of available nodes and wherein the instructions adapt one of the available nodes to join the blockchain network.

4. The computer-implemented system of claim 1 wherein the system is configured to display the fifth value and corresponding identification of the blockchain network, and to further display the fifth value as determined for other operating blockchain networks.

5. The computer-implemented system of claim 1 wherein the system is configured to provide a plurality or users to select an option to automatically configure a new validator node on the block chain wherein the selecting user is identified as the owner.

* * * * *